R. S. BUSBY.
TILTING AND LOCKING DEVICE FOR STEERING WHEELS.
APPLICATION FILED JUNE 17, 1921.
1,424,555.
Patented Aug. 1, 1922.
4 SHEETS—SHEET 2.
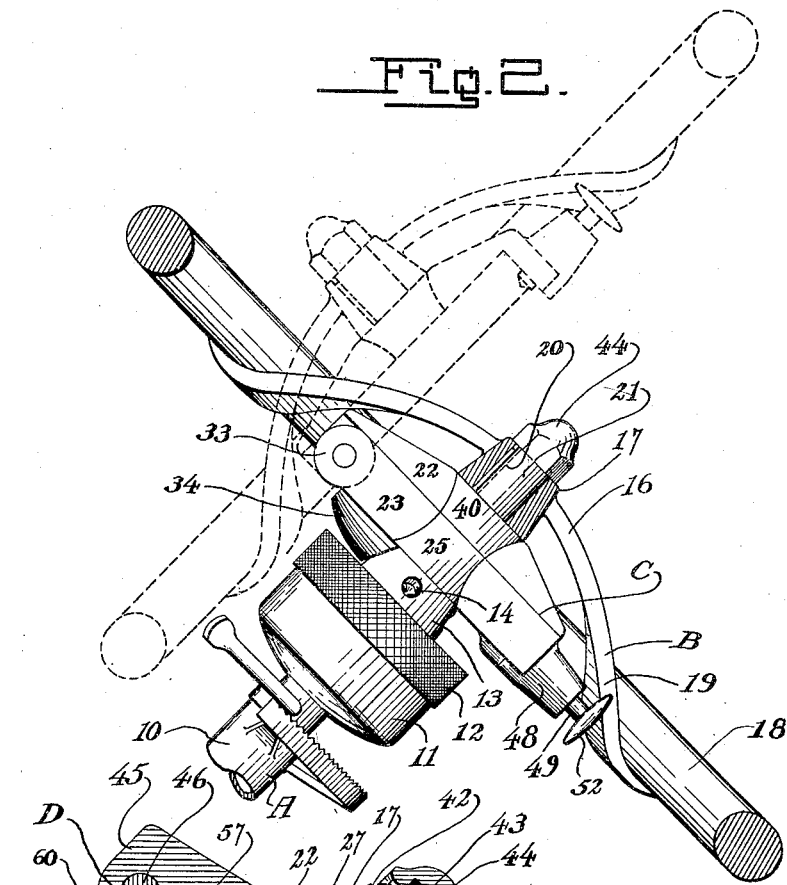
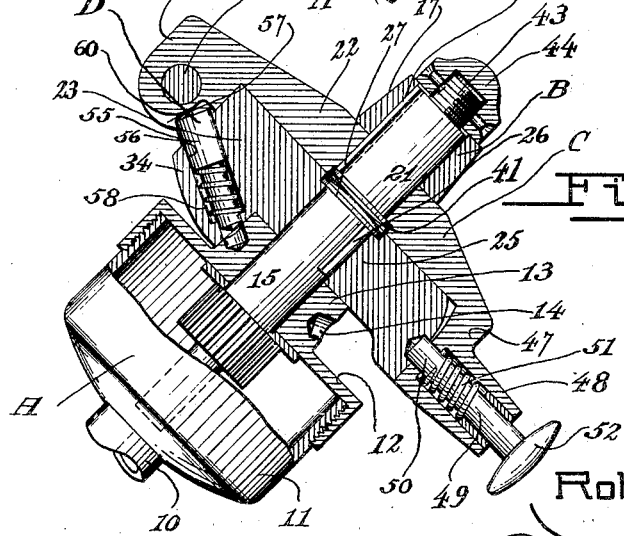
Inventor
Robert S. Busby
By Lancaster and Allwine
Attorneys

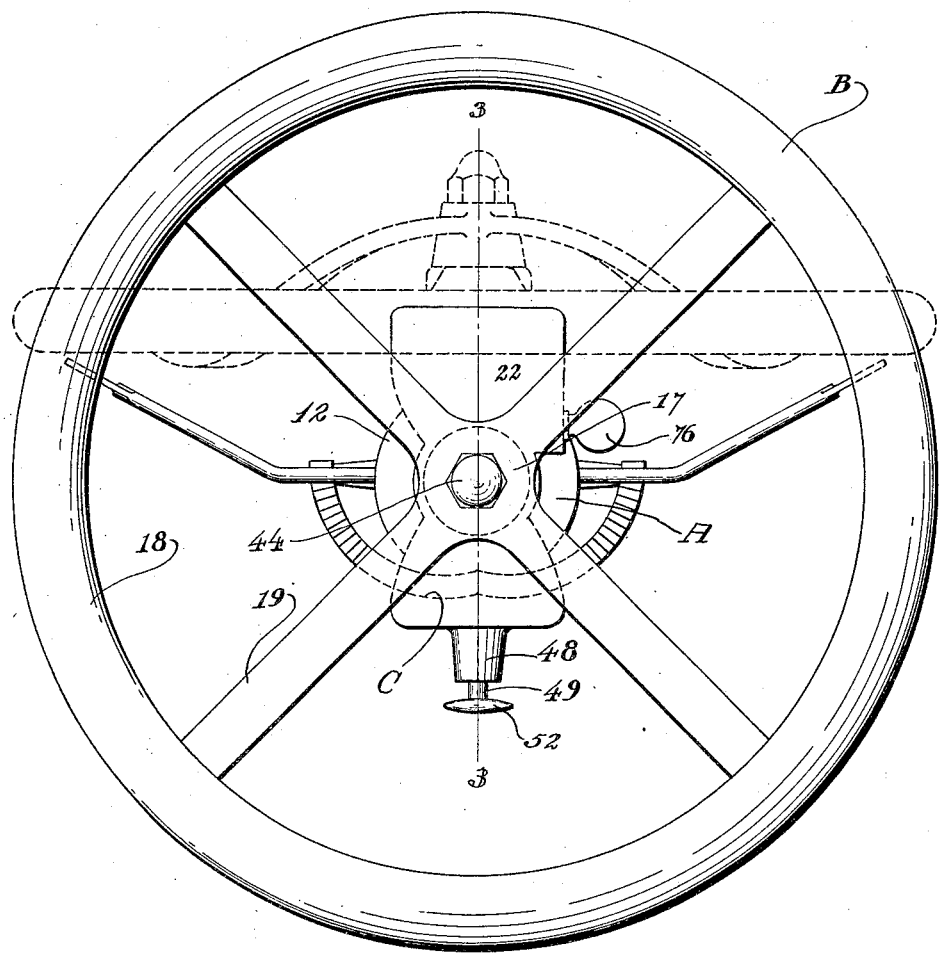

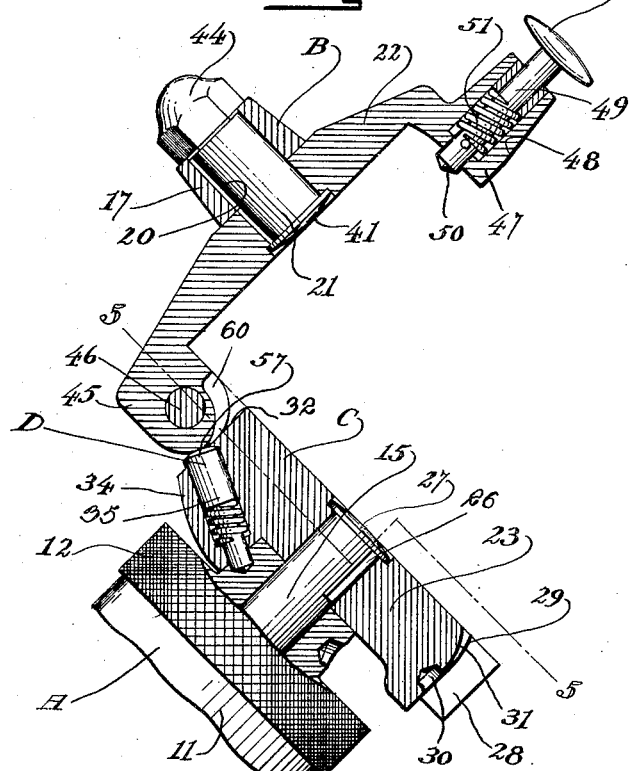
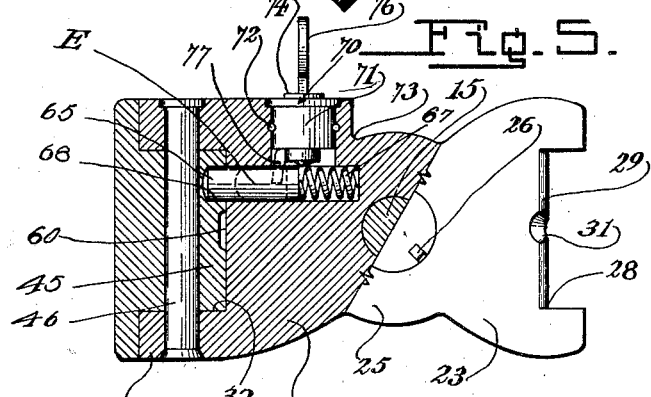

R. S. BUSBY.
TILTING AND LOCKING DEVICE FOR STEERING WHEELS.
APPLICATION FILED JUNE 17, 1921.
1,424,555.
Patented Aug. 1, 1922.
4 SHEETS—SHEET 4.
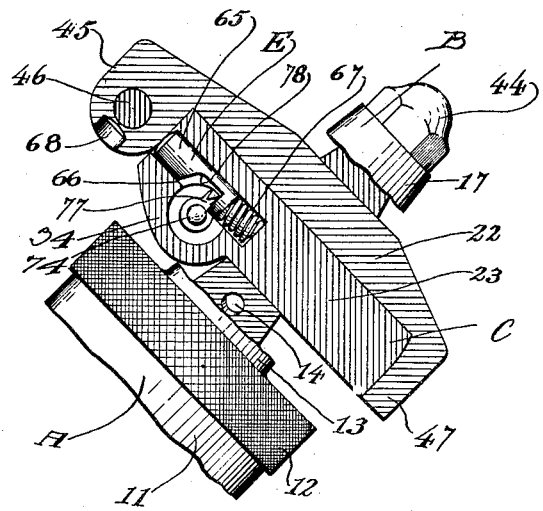
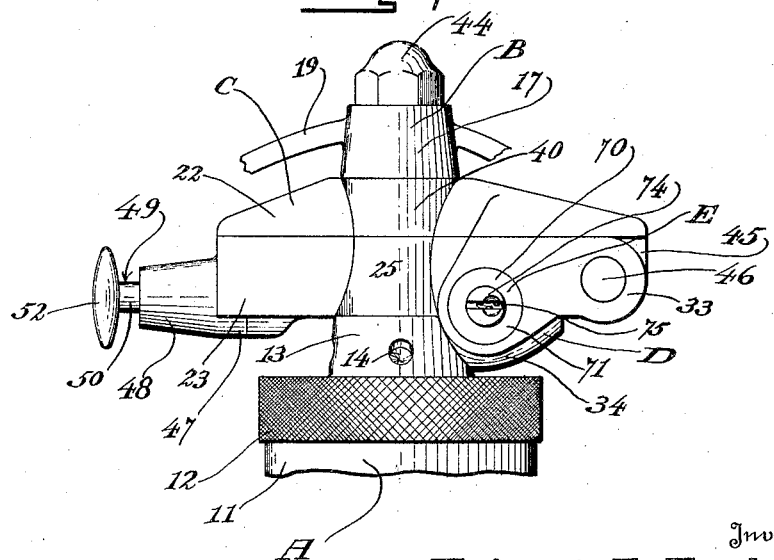
Inventor
Robert S. Busby
By Lancaster and Allwine
Attorneys

UNITED STATES PATENT OFFICE.

ROBERT S. BUSBY, OF JACKSONVILLE, FLORIDA, ASSIGNOR OF ONE-HALF TO ALFRED D. RICHARDSON AND ROY O. BIRCHY, OF JACKSONVILLE, FLORIDA.

TILTING AND LOCKING DEVICE FOR STEERING WHEELS.

1,424,555. Specification of Letters Patent. Patented Aug. 1, 1922.

Application filed June 17, 1921. Serial No. 478,369.

*To all whom it may concern:*

Be it known that I, ROBERT S. BUSBY, a citizen of the United States, residing at Jacksonville, in the county of Duval and State of Florida, have invented certain new and useful Improvements in Tilting and Locking Devices for Steering Wheels, of which the following is a specification.

This invention relates to steering gears for motor vehicles and is an improvement on my pending application filed January 13, 1921, Serial Number 436,991, and the primary objects of the present invention are to provide in an improved steering gear, a novel means for permitting the steering wheel to be tilted away from and out of the path of the driver of the vehicle, second a novel means for locking the wheel in its upright or tilted position and third to provide a novel means for locking the wheel against turning movement, when the same is in its tilted position, so that the steering of the vehicle by unauthorized persons will be prevented.

Another object of the invention is to provide a novel means for associating the novel locking means with the steering wheel and post, so that the wheel will be automatically locked or held against turning movement and in its upright position, when the wheel is swung to its upright position.

A further object of the invention is to provide a novel locking pin carried by one of the castings of the novel locking device arranged to be moved into a locking position with the cap of the steering gear casing formed on the steering column, when the upper casting of the locking device and the steering wheel has been moved to their tilted or upright positions.

With these and other objects in view the invention consists in the novel construction, arrangement and formation of parts, as will be hereinafter more specifically described, claimed and illustrated in the accompanying drawings, forming a part of this specification, in which drawings:

Figure 1 is a plan view of a steering wheel and column, showing the improved locking and tilting device incorporated therewith, the steering wheel being shown in its normal position in full lines, and in its locked upright position in dotted lines.

Fig. 2 is a side elevation of the improved tilting device, the steering wheel being shown in section, the steering wheel being shown in full lines in its normal operative position and in dotted lines in its tilted or upright position.

Fig. 3 is a detail vertical section taken on the line 3—3 of Figure 1.

Fig. 4 is a view similar to Figure 3, showing the upper casting swung to its tilted or upright position.

Fig. 5 is a horizontal section taken on the line 5—5 of Figure 4.

Fig. 6 is a fragmentary longitudinal section through the improved locking device, showing the means employed for locking the upper casting and steering wheel in a tilted or upright position.

Fig. 7 is an enlarged side elevation of the improved device, looking in the opposite direction from Figure 2.

Referring to the drawings in detail, wherein similar reference characters designate corresponding parts throughout the several views, the letter A indicates a steering column, B a steering wheel, and C the improved attachment for connecting the steering column and wheel together.

The steering column A and the steering wheel B are of an ordinary type, utilized in a large number of motor vehicles now on the market, and the improved attachment is particularly adaptable for use in connection therewith, although the device is adaptable to other types of steering wheels and columns. The column A includes the outer stationary shell 10, which has its upper end enlarged to form a casing 11, which is utilized for the steering gear. The outer surface of the casing 11 is externally threaded for the reception of the cap 12, which is of special construction and forms a part of the invention in this instance. The cap 12 is provided with an axial boss 13, which is provided at spaced points, with inwardly extending inclined locking recesses 14, the purpose of which, will be hereinafter more fully described. It can be seen that the cap 12 differs from the ordinary construction of the cap in the provision of the axial boss 13. The cap with its boss 13 rotatably supports the steering post stub shaft 15, which is operatively connected to a suitable type of planetary gearing (not shown), with the main steering gear shaft. This steering gear stub shaft 15 ordinarily receives the steering wheel, which is designated by the letter B, but in this instance, the improved tilting and locking device C is interposed between the wheel and the steering stub shaft.

The steering wheel B is of the ordinary construction as stated, and includes the spider 16, the axial hub 17, the rim 18, and the connecting arms or spokes 19. The hub 17 is provided with the axial opening 20, which ordinarily receives the steering stub shaft 15, but which in this instance, receives the stud 21, which is rigidly carried by and forms a part of the improved tilting and locking device C.

The improved device C includes an upper plate 22 and a lower plate 23, and a novel means D for locking the attachment and wheel against rotary movement, and a novel means E for holding the upper plate 22 and the steering wheel in its upright or tilted position against accidental movement.

The two plates 22 and 23 may be formed of any preferred metal, such as aluminum, brass, steel or the like, either cast in the desired form, or machined to the desired size and configuration.

The inner or lower plate 23 includes a central boss or body 25, which is adapted to receive the stub steering shaft 15, which is keyed in place, by means of a suitable key 26. The upper end of the stub steering rod or shaft 15 can be upset as at 27 in order to prevent the removal of the plate or casting 23 therefrom. The forward portion of the plate or casting 23 is slightly increased in width and the forward edge thereof is provided with an inwardly extending notch 28. The inner wall of the notch 28 is curved as at 29 and is provided with a keeper recess 30, the purpose of which, will be hereinafter more fully described. The wall 28 is also provided with a guide way 31 leading to said keeper recess. The opposite end of the plate is also increased in width and is transversely provided with an inwardly extending notch 32, which defines outwardly extending pivot ears 33. This portion of the plate or casting 23 directly inward of the ears is provided with a depending lug 34, which is shaped to conform to the configuration of the boss 13 formed on the cap 12 and is adapted to snugly engage the outer surface thereof.

The upper plate 22 also includes a central boss 40, which is adapted to receive the stud 21, the inner end of which may be upset as at 41 in order to prevent the removal thereof from the plate. The stud can be keyed or threaded to the plate 22 as well as to the hub 17 of the wheel B, as at 42. The extreme upper end of the stub is reduced and externally threaded as at 43 for the reception of a cap nut 44, which can be pinned or keyed thereto if so desired. The outer end of the plate 22 is provided with a depending hinge barrel 45 which is adapted to lie between the pivot ears 33, and a suitable pivot pin 46 is extended through the ears 33 and the barrel 45 and has its terminals upset, so as to prevent the withdrawal thereof by unauthorized persons. The inner end of the plate 22 is provided with a depending forwardly extending lug 47 which is adapted to fit in the notch 28. The lug 47 is provided with a sleeve 48, which slidably supports the latch 49. This latch 49 includes a bolt 50 which is normally urged inward, by means of an expansion spring 51, which is coiled around the same and fitted within the sleeve 48. The forward end of the bolt 50 can be provided with a suitable operating head 52. The inner end of the bolt 50 is normally adapted to seat within the keeper recess 30 and when the upper plate or casting 22 is moved down to its normal position in abutting engagement with the upper surface of the lower plate or casting 23, the latch bolt 50 will normally swing into the keeper notch 30. It is to be noted that the bolt 50 is guided into the notch or recess 30 by means of the guide way 31.

The means D for preventing turning of the device C and the steering wheel, when the upper plate or casting 22 is in its upright or tilted position with the steering wheel B, includes a sliding locking bolt 55. This bolt is mounted in an inclined guide way 56 formed in depending lug 34. The outer or upper end of the bolt 55 is provided with an enlarged head 57, which is adapted to normally extend outwardly through the outer end of the lower plate 23. The head is normally urged outward of the plate by means of an expansion spring 58 which is coiled around the bolt and engages the head thereof and against a shoulder formed in the bore or guide recess formed in the depending lug 34. The inner or lower end of the bolt 55 is adapted to protrude beyond the inner surface of the lug 34 at such times, and into one of the keeper recesses 14 formed in the boss or sleeve 13 carried by the cap 12. The hinge barrel 45 is provided with a cam guide way 60 that is this guide way or groove 60 is formed deeper at its inner end than at its outer end and the enlarged head 57 of the bolt 55 is adapted to normally fit in this guide or groove. When the upper plate or casting 22 is in abutting position with the lower plate or casting 23, the enlarged head 57 of the bolt normally rests within the deepest portion of the guide or cam groove but it can be seen that when the plate 22 with the steering wheel is tilted or in the upright position the head 57 of the bolt will rest in the shallow portion of the groove, which will force the bolt inwardly and its inner lower end into engagement with one of the keeper recesses 14, which happens to be in alignment therewith.

Thus it can be seen that when the steering wheel is tilted or moved to its upright position, the same is automatically locked with the steering column shell and held against turning movement, thus steering of the vehicle is prevented when the steering wheel is in its tilted position.

The means E for locking the steering wheel in a tilted or upright position includes a sliding bolt 65, which is mounted for movement longitudinally of the plate 23 in an inwardly extending bore 66, which is formed in the plate at one side of the longitudinal center thereof. This bolt is normally urged outwardly of the bore 66 by means of an expansion spring 67 which engages the inner wall of the bore and the inner end of the bolt. The hinge barrel 45 at one side of the cam or guide slot 60 is provided with a keeper recess 68 which is adapted to be moved into alignment with the bore 66 when the plate 23 with the steering wheel is moved to their tilted or upright position. Thus it can be seen that when the steering wheel is moved to a tilted position that the bolt 65 will be forced into a keeper recess 68 by means of the spring 67. This will positively hold the plate and the steering wheel in their upright or tilted position.

In order to hold the bolt against movement when in its locked position an ordinary pin tumbler mechanism 70 is provided. This mechanism is carried by the outer end of the plate 23 and extends transversely thereof as clearly shown in Figures 6 and 7 of the drawings.

The pin tumbler mechanism 70 is of the usual or any preferred make or construction and includes the shell 71, which can be held against movement by suitable pin 72, in an inwardly extending recess 73 formed in the plate 23. The shell 71 receives the ordinary revoluble plug 74 which is provided with a keyway 75 for the reception of the key 76. The key 76 serves to actuate the usual pin tumbler and their complement drivers (not shown). The inner end of the plug 74 carries a crank 77, which is fitted in a suitable notch 78 formed in the bolt 65. In can be seen that when the correct key 76 is placed in the keyway and the plug is turned, that the crank 77 will engage the rear wall of the notch 78 in the bolt 65 and force the bolt 65 inwardly and permit the plate 22 to be moved to its normal abutting position in engagement with the upper face of the lower plate 23. When the plate is moved to its lowered position the same is held against accidental movement by means of the latch 49 as heretobefore described.

From the foregoing description, it can be seen that an improved steering wheel attachment has been provided which will permit the steering wheel to be thrown forwardly and away from the driver of the vehicle in upright position in order to permit the convenient entrance and exit of the driver to the vehicle, the device having a novel means associated therewith for preventing the steering of the vehicle and to prevent swinging movement of the steering wheel when the steering wheel has been moved to a tilted or upright position.

Changes in details may be made without departing from the spirit or scope of this invention, but what I claim as new is,

I claim:

1. In a steering device, the combination of a steering post and a steering wheel, of an attachment therefor interposed between the wheel and post including a pair of hingedly connected members, the members being adapted for engagement respectively with the post and the wheel, whereby relative movement between the wheel and post is permitted, and a locking bolt slidably carried by one of the members for engagement with the other member, when the same is moved to its upright position, and a key operated locking means carried by the first mentioned member for said bolt.

2. In a steering device, the combination with a steering post and a steering wheel, of an attachment therefor interposed between the wheel and post including a pair of abutting members, the members being adapted for engagement respectively with the post and the wheel, means for pivotally securing the outer ends of the members together for permitting the steering wheel to be swung outwardly and away from the driver of the vehicle, a sliding bolt carried by the inner member arranged to engage the outer member, when the same has been moved to a tilted position, and a key operated locking and operating mechanism carried by said member for said bolt.

3. In a steering device, the combination with a steering post and a steering wheel, of an attachment therefor interposed between the wheel and post including a pair of abutting members, the members being adapted for engagement respectively with the post and the wheel, so as to permit relative movement between the post and wheel, means hingedly connecting the outer ends of the members together, a longitudinally extending locking bolt slidably carried by the innermost member, the outermost member having a notch formed therein arranged to be moved into alignment with the bolt when the outermost member is moved to its tilted upright position, and a transversely extending key operated pin and tumbler locking and actuating mechanism carried by the first mentioned member for said locking bolt.

4. In a steering device, the combination with a steering post and a steering wheel, of an attachment therefor interposed between the wheel and post including a pair of members, the members being adapted for connection respectively with the post and the wheel, one of said members having a pair of pivot ears formed on its outer end, the other member having a depending hinge barrel formed on its outer end arranged between the pivot ears, a hinge pin connecting the pivot ears and hinged barrel together, the inner member having a longitudinally extending bore formed therein, the hinged barrel having inwardly extending recesses formed therein arranged to be moved into alignment with the bore when the outer member is moved to a tilted upright position, a spring pressed bolt slidably mounted in the bore arranged to normally project out of the bore, and a transversely extending pin and tumbler key operated lock and actuating mechanism carried by the inner member for said bolt.

5. In a steering device, the combination with a steering post and steering wheel, of an attachment therefor interposed between the wheel and post including a pair of hingedly connected members, the members being arranged for connection respectively with the post and wheel whereby relative movement between the wheel and post is permitted, locking means for preventing swinging movement of said members in relation to each other when the steering wheel has been moved in relation to the steering post, and locking means for preventing turning movement of the members, when the steering wheel has been moved in relation to the post.

6. In a steering device, the combination with a steering column including a shell, a shaft, and a steering wheel, of attachment therefor interposed between the wheel and shaft including a pair of hingedly connected abutting members, the members being adapted for connection respectively with the steering shaft and the wheel whereby relative movement between the wheel and the shaft is permitted, locking means for preventing swinging movement of the members in relation to each other when the steering wheel has been moved in relation to the steering post, and locking means for engaging the shell of the column, when the steering wheel has been moved in relation to the steering post, to prevent turning movement of said member.

7. In a steering device, the combination with a steering post and a steering wheel, and a rigid shell for the post, of an attachment therefor interposed between the wheel and post, including a pair of hingedly connected members, the members being adapted for connection respectively with the post and wheel, whereby relative movement between the wheel and the post is permitted, automatic locking means for holding the members against turning movement in relation to the steering wheel when the wheel has been moved in relation to the steering post, and means for locking the members together against movement when the steering wheel has been swung in relation to the steering post.

8. In a steering device, the combination with a steering column including a shell, a steering shaft, a cap for the upper end of the shell, an axial boss formed on the cap having a plurality of keeper openings formed therein, and a steering wheel, of a pair of hingedly connected members interposed between the wheel and the steering shaft for connection respectively with the wheel and shaft, a sliding bolt carried by the innermost member, and means formed on the outer member for moving the bolt into engagement with one of the keeper openings in the boss, when the steering wheel has been swung to its tilted position, and means for locking the members against accidental movement when the steering wheel has been moved to its tilted position.

9. In a steering device, the combination with a steering column including a shell, a steering shaft rotatably mounted in the shell, a cap for the shell, including an axial boss having a plurality of keeper openings formed therein, a steering wheel, of a pair of abutting plates, the innermost abutting plate having a pair of outwardly extending pivot ears formed thereon, the uppermost plate having a depending pivot barrel arranged between the ears, and a pivot pin connecting the ears and the barrel together, an inclined locking bolt slidably carried by the innermost member, means normally projecting the bolt outwardly of the outer end of the innermost plate, a cam formed on the outermost member for engaging the bolt, when the steering wheel has been moved to its tilted position, for moving said bolt into any one of said keeper openings.

10. In a steering device, the combination with a steering column including a shell, a steering shaft rotatably mounted in the shell, a gearing cap for the shell, including an axial boss having a plurality of keeper openings formed therein, a steering wheel, of a pair of abutting plates, the innermost abutting plate having a pair of outwardly extending pivot ears formed thereon, the uppermost plate having a depending pivot barrel arranged between the ears, and a pivot pin connecting the ears and the barrel together, an inclined locking bolt slidably carried by the innermost member, means normally projecting the bolt outwardly of the outer end of the innermost plate, a cam formed on the outermost member for engaging the bolt, when the steering wheel has been moved to its tilted position, for moving said bolt into any one of said keeper openings, and a locking bolt slidably carried by the innermost member for engaging the outermost member when the steering wheel has been swung to its tilted position in order to prevent accidental movement between said members.

ROBERT S. BUSBY.